UNITED STATES PATENT OFFICE.

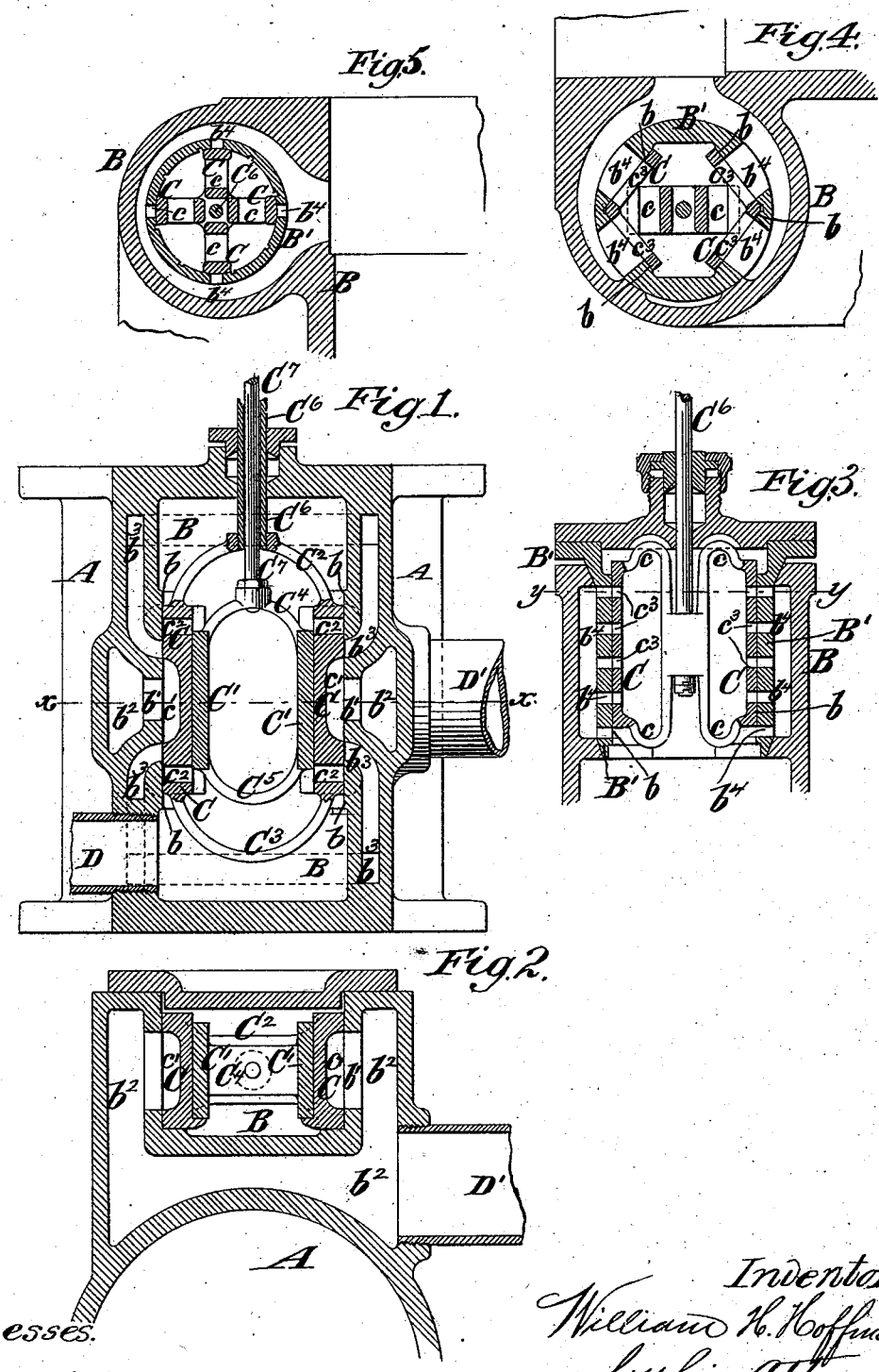

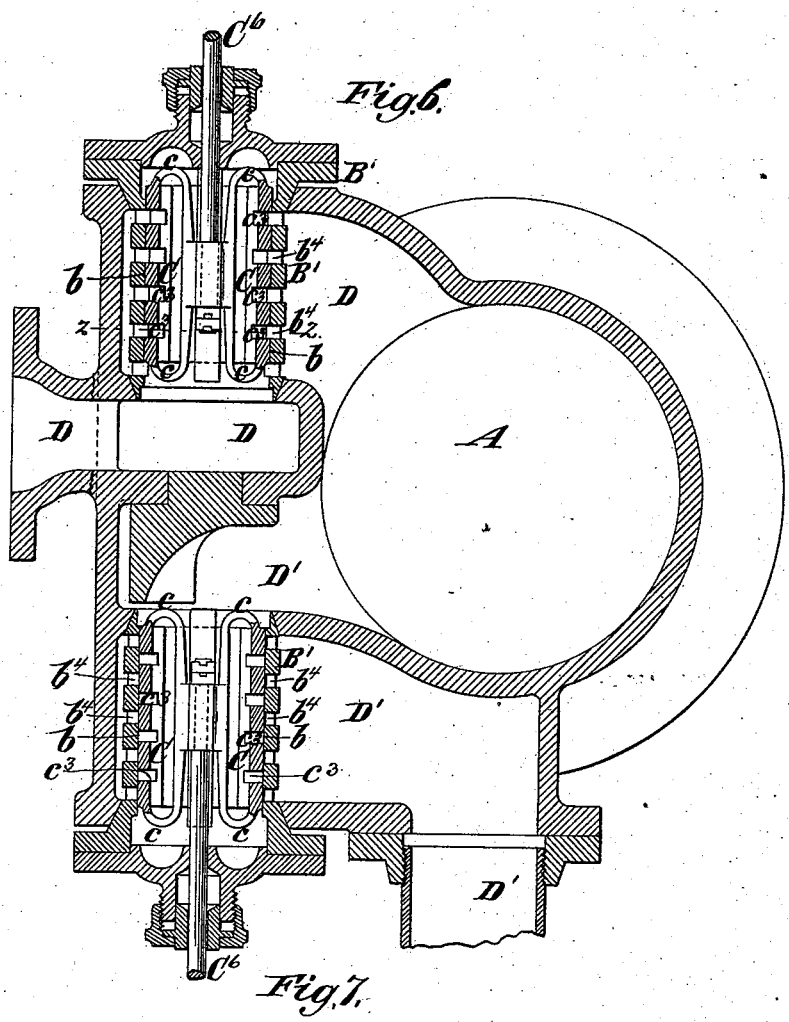

WILLIAM H. HOFFMAN, OF NEW YORK, N. Y.

VALVE FOR STEAM-ENGINES.

SPECIFICATION forming part of Letters Patent No. 380,037, dated March 27, 1888.

Application filed September 26, 1887. Serial No. 250,669. (No model.)

*To all whom it may concern:*

Be it known that I, WILLIAM H. HOFFMAN, of the city and county of New York, in the State of New York, have invented a new and useful Improvement in Valves for Steam-Engines and other Purposes, of which the following is a specification.

My invention relates to those valves and valve-chests in which the valve-chest or chest-lining has bearings for the valve at points opposite each other—such, for example, as are afforded by a piston-valve working within a valve-chest having a cylindric bore. In all such valves as heretofore made the tight working of the valve upon its seat has been provided for by packing-rings or other packing pieces or strips which are movable in and relatively to the body of the valve, and which may be forced upon the valve-seat by the pressure of springs or by the action of the steam or other motive fluid upon them.

The object of my invention is to provide a valve of this character which shall work tightly upon its seat or seats without the employment of any packings of any kind, and in which the valve itself will be expanded against the bearings in the valve-chest by the pressure of the motive fluid within it.

The invention consists in the combination, with a valve-chest having bearings for the valve at points opposite each other, of a valve consisting of a skeleton structure formed in a single piece and having parallel members fitting said bearings and arms connecting them, whereby said bars or members are by the pressure of motive fluid within the valve expanded against said bearings.

The invention also consists in the combination, with a valve-chest having bearings for the valve at points opposite each other, of a valve consisting of a skeleton structure having parallel bars or members which work on the bearings and are supported by curved arms which are rigidly connected with said bars or members, but are capable of deflection to permit the bodily expansion of the valve by motive fluid within it.

In the accompanying drawings, Figure 1 is a longitudinal section of a valve and valve-chest embodying my invention, the valve being made in the form of two slide-valves working against seats which are opposite each other, and also showing a cut-off valve composed of two additional slide-valves or plates connected together and working on the backs of the two slide-valves which compose the main valve. Fig. 2 is a transverse section upon the plane of the dotted line $x\ x$, Fig. 1. Fig. 3 is a longitudinal section of a valve-chest including two plates or members which work upon seats opposite each other, and which are formed with numerous openings, so as to constitute a register-valve. Fig. 4 is a transverse section on the plane of the dotted line $y\ y$, Fig. 3. Fig. 5 is a transverse section of a cylindric valve and its chest embodying my invention and adapted to rotate or oscillate. Fig. 6 is a sectional view in a plane transverse to a cylinder and showing supply and exhaust valves embodying my invention; and Fig. 7 is a transverse section upon the plane of the dotted line $z\ z$, Fig. 6.

Similar letters of reference designate corresponding parts in all the figures.

In all the examples of my invention which are herein illustrated the valve comprises at least two members which work upon seats or bearings at points opposite each other in a valve-chest, and these members are expanded by the pressure of motive fluid within the valve, in contradistinction to packings which are movable relatively to the body of a valve and which are expanded in said body by the action of the motive fluid or springs.

Referring first to the construction shown in Figs. 1 and 2, A designates a cylinder on which is a valve-chest, B. This valve-chest has at opposite points two bearings, $b$, which, in this example of the invention, constitute the seats for two ordinary slide-valves, C, and said seats have in them exhaust-ports $b'$, which communicate with the belt or surrounding space $b^2$, and supply-ports $b^3$ leading to opposite ends of the cylinder.

In each slide-valve C there is an exhaust-cove, $c'$, and ports $c^2$, and the ports $c^2$ of both the valves C or valve portions are controlled by cut-off plates or valves C', working upon the back of the main valves or valve portions C in a well-understood manner.

D designates the supply-pipe, and D' the exhaust-pipe, which communicates with the belt or passage $b^2$. The two main valves or valve portions C are supported at opposite ends by curved arms, (here shown as formed by bows $C^2 C^3$, best shown in Fig. 1,) and the two cut-off valves or valve portions C′ are likewise shown as connected by bows $C^4 C^5$. With the bows $C^2 C^4$ are connected the main-valve rod $C^6$, which is tubular, and the cut-off-valve rod $C^7$, which works through the main-valve rod in a well-understood manner.

Now, it will be observed that the two main valves or valve portions C constitute, with their connecting-arms, a skeleton valve, and the two cut-off valves or valve portions C′, with their connecting or supporting arms, likewise constitute a skeleton cut-off valve. Steam or other motive fluid entering the valve-chest B has free access into and through the valves, and by its pressure serves to expand the valves and to cause them to work tightly upon their bearings or seats.

It will be observed that the curved supporting-arms or the curved bows which connect and support the valve portions provide for the ready expansion of the valve portions or members, and the valve portions or members C are expanded against the seats or bearings b, while the cut-off-valve portions or members C′ are expanded and caused to work tightly against the backs of the main-valve members. In the example of my invention shown in Figs. 3 and 4 the valve-chest B has arranged within it a bushing or sleeve, B′, which constitutes a false chest or lining and in which are numerous openings, $b^4$. The valve here shown has two members C, which are supported and connected by curved arms c and constitute a skeleton valve operated by a rod, $C^6$. The valve portions C in this example of my invention have numerous openings, $c^3$, which register with the openings $b^4$ in the chest-lining B′, thereby constituting a register-valve which, when reciprocated, serves to open and close the ports $b^4$, and which may be used for any purpose. The two seats or bearings b, which are at points opposite each other in the valve-chest lining B′, may be flat and parallel, or they may be of the shape shown in the transverse section, Fig. 4, and the valve members or portions C of corresponding shape. As there shown, each valve portion or member is of V shape and fits in a V-shaped seat or bearing, b.

In the example of my invention shown in Fig. 5 the valve-chest B has a lining, B′, which has in it slots or openings $b^4$, and the valve has parallel members or bars C, which are supported by curved arms c at opposite ends and which radiate from a center hub with which the rod $C^6$ is connected. This valve is intended to be rotated or partially turned to open and close the slots or ports $b^4$ by the bars or members C, and as steam has free access to the interior of the valve it acts upon these bars or members to force them in opposite directions, thus maintaining them tightly against the chest-lining B′ adjacent to the ports or openings $b^4$.

In the example of my invention shown in Figs. 6 and 7 the cylinder A has at each end an inlet passage and nozzle, D, and an exhaust passage and pipe, D′. In the supply-passage D, leading to the cylinder at each end, and also in each exhaust D′, is a chest-lining, B′, which has in it numerous ports or openings, $b^4$, controlled by a valve which comprises bars or members C, connected at their ends by curved arms c, which radiate from the center of the valve and from a hub with which the rod $C^6$ is connected.

The bars or members C of the valve have numerous openings or passages, $c^3$, which control the ports or perforations $b^4$ in the chest-lining B′, and as the valve is reciprocated through the rod $C^6$ the ports or openings $b^4$ are alternately opened and closed. Steam received through the supply pipe and passage D has to pass through the center of the valve chest or lining B′, which contains the supply-valve, and thus has free access to the valve itself and acts to expand the bars or members and cause them to work tightly against the seats or bearings b, which are at points opposite each other in the chest-lining B′. Steam or other fluid exhausted from the cylinder through the passage D′ has to make its exit lengthwise through the chest-lining B′, and therefore has free access to the interior of the skeleton exhaust-valve, and by its pressure serves to hold the bars or members C tightly against the seats or bearings b, which are arranged opposite each other in the chest-lining B′. As here represented, and as shown in Fig. 7, each valve has four bars or members C, each forming about a quarter-section of a circle, and the spaces D D′ around the chest-linings B′ are sufficient for the free passage of steam or motive fluid around these chest-linings.

It will be seen that in all the examples of my invention is employed a skeleton valve to the interior of which steam or other motive fluid has free access, and which comprises parallel bars or members which are by the pressure of motive fluid within the skeleton valve expanded against the seats or bearings at points opposite each other in the valve-chest.

It will be obvious that in the operation of my valve a considerable degree of pressure, often amounting to two-thirds or three-quarters the chest-pressure, will be required to change the form of the valve and bring it to a steam-tight bearing upon its seat or seats, and it will therefore be understood that to the extent of this pressure the valve is balanced.

The amount of pressure which will be required to expand the valve or change its form will vary according to the thickness of metal in its different parts and the form of the arms which support its parallel bars or members, and therefore the extent to which the valve is balanced may be varied by changing the proportion of parts and the form of said arms.

I am aware that it is not new to employ in connection with a valve-chest having seats or bearings at points opposite each other a valve which is in reality composed of two or more separate valves which are formed distinct from each other and afterward connected with the valve-rod, so that they will be free to move and press against the bearings or seats by the pressure of steam acting between them. The valves which are shown in Patents No. 98,322, granted December 28, 1869, to T. Warren, No. 247,725, granted September 27, 1881, to S. Whinery, and No. 280,312, granted June 26, 1883, to N. G. Herreschoff, are all of substantially this character.

I am also aware of Patent No. 144,205, granted November 4, 1873, to J. E. Hugou, and do not desire to include in my invention such a valve as that which is shown in that patent. In the valve there shown packing-pieces made separate from the valve are employed, and it is not apparent from that patent that the steam acting within the valve may expand it bodily, so that it will always work with sufficient tightness upon its seats. My valve is distinguished from that shown in said patent to Hugou in that its parallel bars or members are connected by arms which are rigidly connected with them—as, for example, by casting the valve all in one piece—and the pressure of steam within the valve will cause the deflection of these arms and the bodily expansion of the bars or members which bear upon the seats or bearings of the valve-chest.

What I claim as my invention, and desire to secure by Letters Patent, is—

1. The combination, with a valve-chest having bearings for the valve at points opposite each other, of a valve consisting of a skeleton structure formed in a single piece and having parallel members fitting said bearings, and arms connecting said parallel members, whereby they are, by the pressure of motive fluid within the valve, expanded against said bearings, substantially as herein described.

2. The combination, with a valve-chest having bearings for the valve at points opposite each other, of a valve consisting of a skeleton structure having parallel bars or members which work on said bearings and are supported by curved arms, as c, which are rigidly connected with said bars or members, but are capable of deflection to permit the bodily expansion of the valve by the pressure of motive fluid within it, substantially as herein described.

WILLIAM H. HOFFMAN.

Witnesses:
  C. HALL,
  FREDK. HAYNES.